(12) United States Patent
Piegay et al.

(10) Patent No.: US 10,977,782 B2
(45) Date of Patent: Apr. 13, 2021

(54) METHOD OF SORTING BAGGAGE AT AN AIRPORT WITH OPTIMIZED VIDEO-ENCODING

(71) Applicants: Emmanuel Piegay, Paris (FR); Alexa Floury, Paris (FR); Hicham Le Bernoussi, Paris (FR)

(72) Inventors: Emmanuel Piegay, Paris (FR); Alexa Floury, Paris (FR); Hicham Le Bernoussi, Paris (FR)

(73) Assignee: SOLYSTIC, Bagneux (FR)

( * ) Notice: Subject to any disclaimer, the term of this patent is extended or adjusted under 35 U.S.C. 154(b) by 133 days.

(21) Appl. No.: 16/420,419

(22) Filed: May 23, 2019

(65) Prior Publication Data

US 2019/0362485 A1    Nov. 28, 2019

(30) Foreign Application Priority Data

May 24, 2018   (FR) ...................................... 1870601

(51) Int. Cl.

| | |
|---|---|
| *B07C 3/20* | (2006.01) |
| *B64F 1/36* | (2017.01) |
| *G06F 16/955* | (2019.01) |
| *G06K 7/14* | (2006.01) |
| *G06K 9/00* | (2006.01) |
| *G06K 9/32* | (2006.01) |
| *G06Q 50/28* | (2012.01) |
| *G06T 7/00* | (2017.01) |

(52) U.S. Cl.
CPC ........ *G06T 7/0002* (2013.01); *G06F 16/9554* (2019.01); *G06K 7/1413* (2013.01); *G06K 9/00469* (2013.01); *G06K 9/325* (2013.01); *G06Q 50/28* (2013.01); *G06K 2209/01* (2013.01); *G06T 2207/30168* (2013.01)

(58) Field of Classification Search
None
See application file for complete search history.

(56) References Cited

U.S. PATENT DOCUMENTS 8,301,296 B2 *  10/2012  Grundmann ........... G06Q 50/28
                                                    700/224
9,714,099 B2 *   7/2017  Dinkelmann .......... G06Q 10/08
(Continued)

FOREIGN PATENT DOCUMENTS

DE    197 48 702 C1    11/1998
DE    197 42 771 C1    12/1998
(Continued)

*Primary Examiner* — Soo Shin
(74) *Attorney, Agent, or Firm* — Ware, Fressola, Maguire & Barber LLP

(57) ABSTRACT

A method of sorting baggage at an airport, which method comprises acquiring a plurality of digital images (IN) of a piece of baggage, which piece of baggage carries an unambiguous identification label bearing textual information about a flight, the method further comprising video coding in which a computer unit automatically detects the presence of characteristic elements of the unambiguous identification label in the digital images, computes a score for each of the digital images on the basis of a count of the characteristic elements, ranks the images as a function of their respective scores, and displays the images on a screen (132) as a function of the ranking.

16 Claims, 3 Drawing Sheets

(56) References Cited

U.S. PATENT DOCUMENTS

| | | | | |
|---|---|---|---|---|
| 2014/0184387 A1* | 7/2014 | Svec | ............ | G06Q 10/083 340/8.1 |
| 2017/0061179 A1* | 3/2017 | Delianski | ............ | B64F 1/368 |
| 2019/0019086 A1* | 1/2019 | Schuler | ............ | G06N 3/08 |
| 2019/0026587 A1* | 1/2019 | Simpson | ............ | G06K 9/00442 |
| 2019/0039098 A1* | 2/2019 | Berger | ............ | B07C 3/14 |
| 2019/0095744 A1* | 3/2019 | Hager | ............ | G06Q 10/08 |
| 2019/0359429 A1* | 11/2019 | Floury | ............ | G06T 7/0004 |

FOREIGN PATENT DOCUMENTS

| | | | | |
|---|---|---|---|---|
| DE | 20 2015 006102 U1 | 11/2015 | | |
| WO | WO-2009015991 A1 * | 2/2009 | ............ | G06Q 10/08 |
| WO | 2017/137106 A1 | 8/2017 | | |
| WO | WO-2017148550 A1 * | 9/2017 | ............ | G06Q 10/0838 |

* cited by examiner

METHOD OF SORTING BAGGAGE AT AN AIRPORT WITH OPTIMIZED VIDEO-ENCODING

CROSS REFERENCE TO RELATED APPLICATIONS

This application claims priority under 35 USC § 119 to French Patent Application No. 1870601 filed on May 24, 2018, which application is hereby incorporated by reference in its entirety.

TECHNICAL FIELD

A method of sorting baggage at an airport, which method comprises acquiring a plurality of digital images of a piece of baggage that are taken from different viewpoints, which piece of baggage carries an unambiguous identification label bearing textual information about a flight.

PRIOR ART

Such a type of method is described in Patent Application WO 2017/137106, which discloses a method in which each piece of baggage is provided with an identification label bearing lines of textual information and a bar code, which bar code enables each piece of baggage to be associated unambiguously with a data set recorded in a baggage database that is compiled as the baggage is being checked in.

Thus, reading the bar code or extracting textual information by using a computer system based on optical character recognition (OCR) analysis makes it possible to track and to direct a piece of baggage in an automated conveyor system at the departure airport and at the arrival airport, the relevant information from the database being transmitted to the airports in question.

In Document WO 2017/137106, textual information is extracted in the event that it is difficult or impossible to read the bar code automatically. Such a difficulty occurs, for example, when the label is soiled or damaged, and the extraction is then based on comparing the recognized textual elements of the label with the data recorded in the baggage database.

Conversely, WO 2017/137106 does not address the problems related to when it is impossible to perform satisfactory OCR analysis and/or to access the data in the baggage database.

Document DE 20 2015 006 102 describes a method of sorting baggage at an airport, comprising acquiring a plurality of images of a piece of baggage, and video coding for displaying the images on a screen, but that method can be improved.

SUMMARY OF THE INVENTION

To these ends, the invention provides a method of sorting baggage at an airport, which method comprises acquiring a plurality of digital images of a piece of baggage that are taken from different viewpoints, which piece of baggage carries an unambiguous identification label bearing textual information about a flight, the method further comprising video coding in which a computer unit automatically detects the presence of characteristic elements of the unambiguous identification label in the digital images of the piece of baggage, computes a score for each of the digital images on the basis of a count of the characteristic elements detected in each image, ranks the digital images as a function of their respective scores, and displays said images on a screen as a function of said ranking.

Displaying the digital images as a function of their ranking results in accelerating inputting of the data by the operative at the video coding station.

In this way, automatic selection and presentation of relevant images of pieces of baggage simplifies the work of the operative in making decisions about identifying the departure airport and the destination airport of the piece of baggage to be sorted, thereby considerably increasing the speed of sorting of the piece of baggage when it is impossible to perform fully automated sorting.

The method of the invention may advantageously have the following features:
 the computer unit may make a selection of the images on the basis of their respective scores and may display the images of the selection first on the screen to the operative;
 the computer unit may display the images of the selection simultaneously on the screen;
 the computer unit may display the images of the selection sequentially on the screen on the basis of their respective scores;
 the computer unit may display on the screen an enlargement of a region of interest including a characteristic element detected in one of the digital images;
 the characteristic elements may be chosen from among a bar code, an International Air Transport Association (IATA) airport code, a flight number, and a date of a flight;
 information that is retrieved from a database may be used to compute the scores;
 the computer unit may also display on the screen information retrieved from a flights database, from among which information an operative chooses the information that said operative enters into the computer unit; and
 the computer unit may also display on the screen information retrieved from a baggage database, from among which information an operative chooses the information that said operative enters into the computer unit.

Thus, selecting and displaying the digital images of the piece of baggage can be optimized on the basis of criteria relevant for sorting the piece of baggage, in order to facilitate and accelerate identification of said piece of baggage by a human operative.

In addition, the decision by the human operative may be based on the contents of a flights database, access to which and the contents of which can be robust because such a flights database can be local and prepared in advance, and can be independent from a baggage database that is remote and that is compiled as the baggage is being checked in.

BRIEF DESCRIPTION OF THE DRAWINGS

The present invention can be better understood and other advantages appear on reading the following detailed description of an implementation given by way of non-limiting example and with reference to the accompanying drawings, in which.

DESCRIPTION OF AN IMPLEMENTATION

A method of the invention for sorting baggage at an airport is shown by FIGS. 1A to 3C.

Figure 3A:
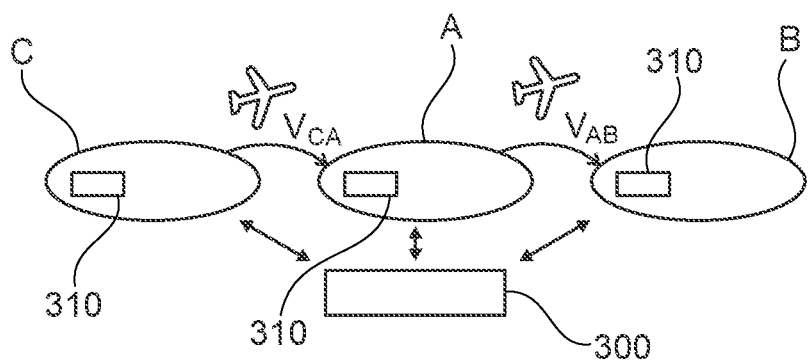
FIG. 3A shows airports and associated databases.

During a journey by air from an airport A to an airport B, or from an airport C to airport A, such journeys being respectively referenced $V_{AB}$ and $V_{CA}$ as shown in FIG. 3A, a piece of baggage conveyed at airport A is identified by means of an unambiguous identification label 100 attached to said piece of baggage.

The label bears a bar code and is printed out at the time the piece of baggage is checked in, in such a manner as to associate the bar code with a set of information relating to the piece of baggage, such as a flight number, an airline, or a check-in number, which set of information is recorded in a baggage database (300) compiled as the baggage is being checked in at a departure airport and is then transmitted between the airports in question by means of a computer network.

In addition to the bar code 220, said label 100 bears textual information that can be useful for tracking the piece of baggage and for directing it towards its destination, such as an IATA airport code composed of a three-letter acronym 222 corresponding to an airport, and a flight number 226 composed of an encoded name 127 of an airline and of a flight number 228 internal to that airline, a date 224, and a city 230, as shown in FIG. 2A.

In the present implementation, the piece of baggage 110 is transported within an airport by a conveyor 102 of a conveyor system 101 controlled by an automatic sorting unit 140 and goes through or past an identification system 130 comprising a reader device 125 for reading the bar code 220 on the label 100 with a view to sorting said piece of baggage as a function of the data associated with the bar code in the baggage database 300.

The identification system 130 also includes a gate-forming gantry 131 equipped with a plurality of cameras 120 arranged to acquire digital images IN of the piece of baggage 110 as seen from different angles, in order to maximize the chances of having usable images of the label 100.

In the event the automatic reading (reading of the bar code 220 or OCR reading of the textual information) fails to sort the piece of baggage, it is possible to use the digital images IN to perform sorting by video coding, in which the digital images are presented to a human operative who identifies information that corresponds to the textual information on the label and inputs it manually into a computer system in order to direct the piece of baggage in the conveyor system 101.

For example, a gate-forming gantry may have ten cameras, each of which acquires a series S(IN) of, e.g. ten, digital images IN of the piece of baggage, and can thus produce a set E(IN) of one hundred digital images IN that can be presented to the human operative Op.

Such a number of images guarantees with a high level of certainty the presence of at least one digital image enabling the operative to make a decision about the information to be entered manually, but, in the absence of optimization of the presentation of the images, it can be necessary for the operative to view a large number of images before finding one in which the label of the piece of baggage is present and legible.

The label might be hidden from some of the cameras by the piece of baggage itself, e.g. if it is under said baggage, and, even if it is visible, its orientation might make it illegible in the majority of the digital images.

Figure 2B:
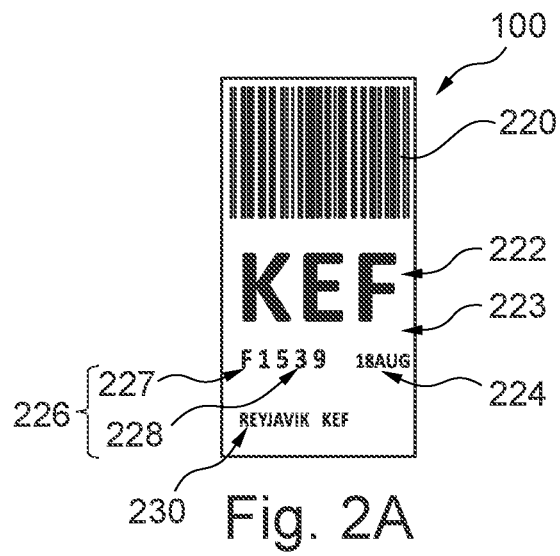
FIG. 2A shows an identification label attached to the piece of baggage of FIG. 1A, and FIGS. 2B to 2D show images of pieces of baggage used in the method of FIGS. 1B and 1C.
Figure 2B:
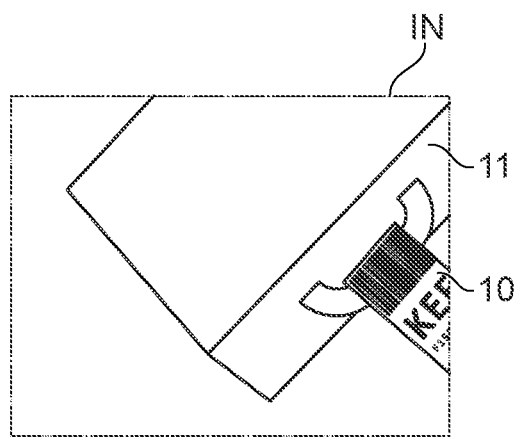
Figure 2C:
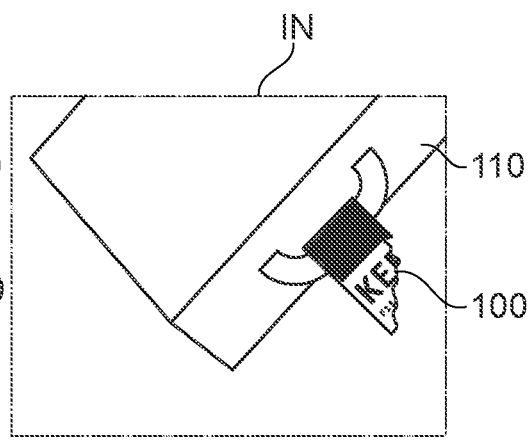

In addition, a label might be only partially visible in a digital image IN, or indeed it might be damaged, as in FIGS. 2B and 2C.

Thus, each digital image IN considered individually has a high likelihood of being unusable for sorting by video coding.

In accordance with the invention, a computer unit 135 puts the digital images into an order of priority so as to help the human operative in charge of the video coding by giving priority to presenting the images that are most likely to contain information that is useful for the video coding.

Figure 1A:
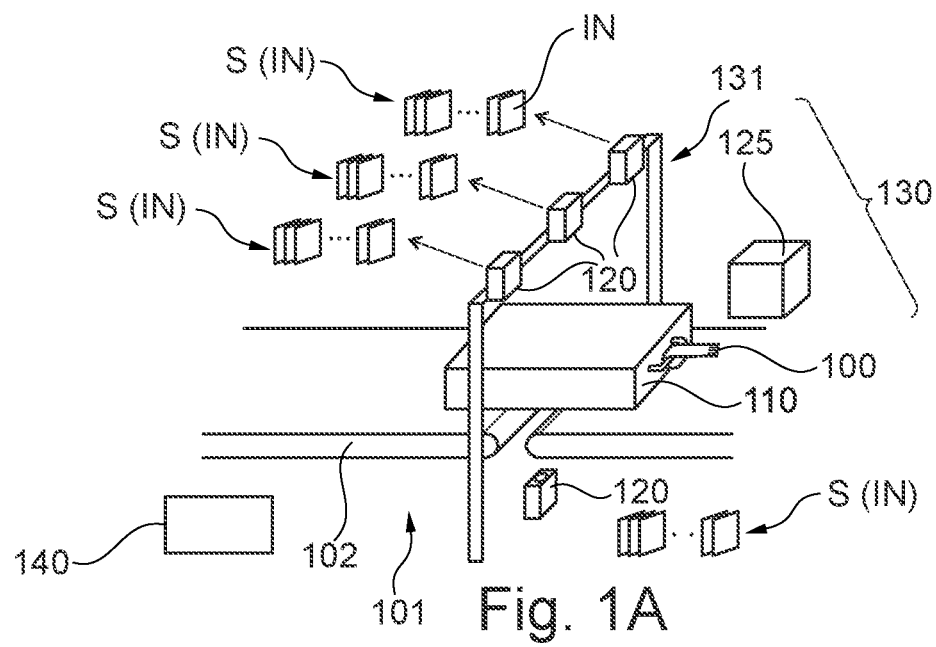
FIG. 1A shows a piece of baggage being conveyed under a gate-forming gantry equipped with cameras at an airport.
Figure 1B:
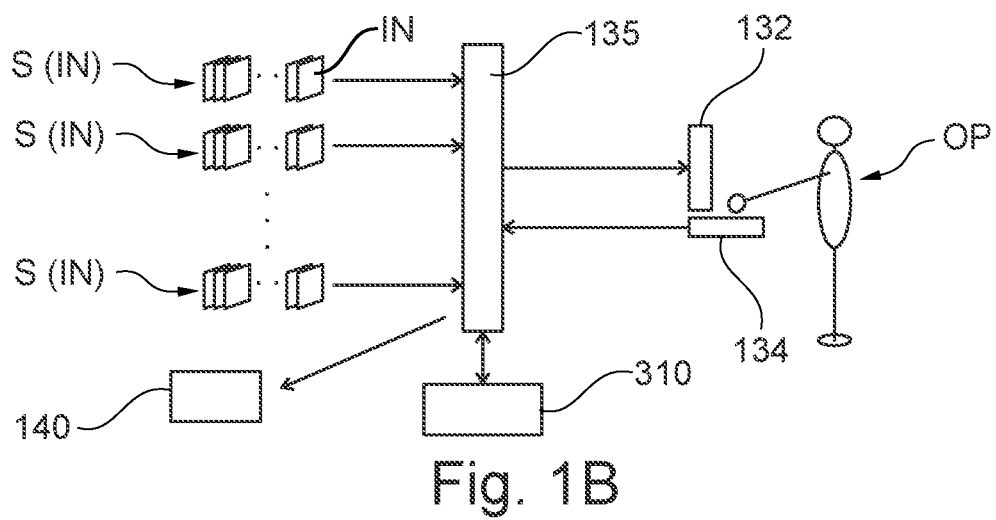
FIGS. 1B and 1C show a video coding method of the invention.
Figure 1C:
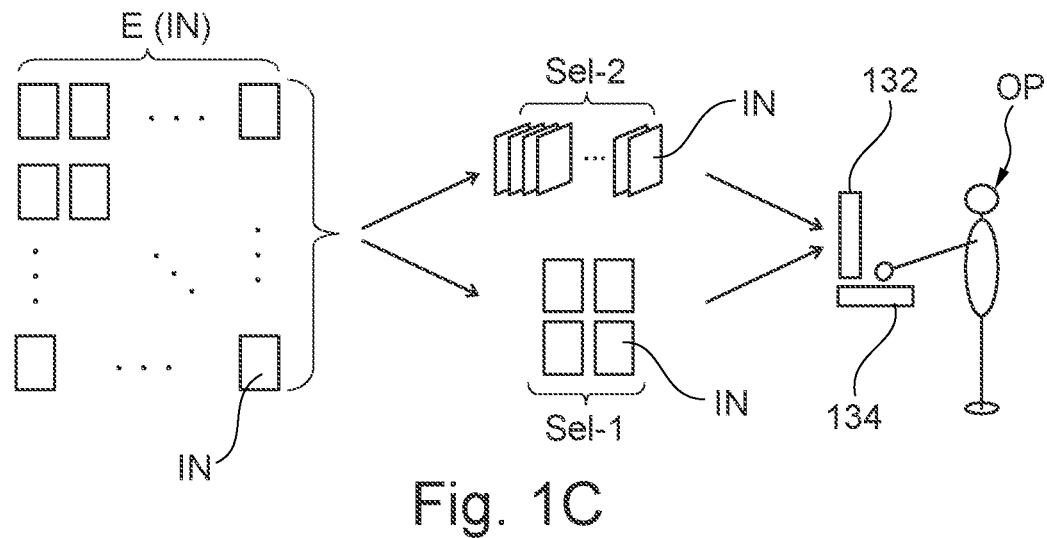
Figures 3B, 3C:
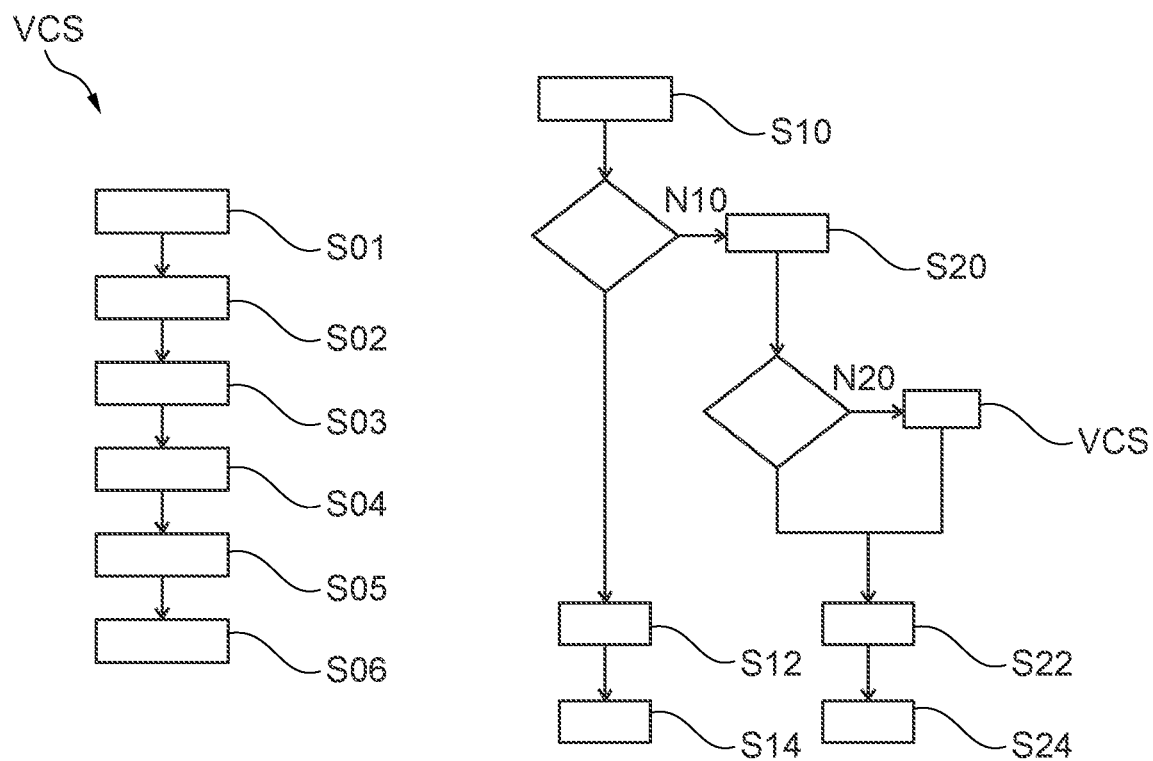
FIGS. 3B and 3C are flow charts showing a sorting method of the invention.

In a first step S01 of the video coding VCS shown in FIGS. 1B, 1C, and 3B, the computer unit 135 collects the set E(IN) of digital images acquired by the cameras 120 during a step S01, and then automatically, for each of the digital images, performs search software analysis so as to search for characteristic elements of the identification label 100 during a step S02, in such a manner as to detect in the digital image the presence, or absence, of such characteristic elements.

Absence of any one of these characteristic elements in an image can be deduced from negative detection of the element, i.e. absence of detection of that element in spite of the search software analysis.

The characteristic elements that are searched for are chosen to be indicative of the probability that an image IN shows the label 100, and in particular shows the textual information on which the human operative bases the identification; said characteristic elements may be a triplet of characters 222 potentially corresponding to an IATA airport code, a line of characters 226 potentially corresponding to a flight number, a line of characters 226 potentially corresponding to a flight number in the vicinity of a triplet 222 of characters, a line of characters 224 potentially corresponding to the date of the flight, any line of characters or any graphics usually present on a label affixed to baggage at an airport for identification purposes, a quality of automatic reading of said elements, a bar code 220, or a blank region 223 in the vicinity of a triplet 222 of characters potentially corresponding to an IATA airport code.

The potential correspondences mentioned above are to be taken in the following sense: the search software analysis can identify textual characters and lines of such characters in terms of numbers, in terms of types (such as digits, letters, or other types) and/or in terms of sequences that correspond to textual information that is usually to be found on the label, but it does not necessarily make said elements correspond to information such as an existing flight number, with any such interpretation of the identified elements being entrusted to the human operative in the context of the video coding.

For example, a line comprising two letters followed by three digits may be considered to correspond potentially to a flight number such as the flight number 226 shown in FIG. 2A.

On the basis of a count of the presences and of the absences of the characteristic elements, the computer unit then computes a score for each of the digital images during a step S03, which score may, for example, be obtained by assigning a positive index to each characteristic element detected, and thus considered to be present in the image, a negative index to each characteristic element not detected, and thus considered to be absent from the image, and then by summing the indices for each digital image, so that the digital images that have the highest scores are the most likely to show the textual information of the label and thus to be useful to the operative.

Computing the score may be based on weighting rules that are determined empirically or may be performed on the basis of automatic learning, e.g. by using a neural network.

The score may also be computed directly by neural analysis of the pixel image.

The score may also be computed using information retrieved from a database, such as the baggage database when said baggage database is available or a flights database, e.g. by increasing the index assigned to a potential correspondence that actually corresponds to an item of data present in said database.

Once the scores have been established, the computer unit ranks the digital images IN as a function of their respective scores during a step S04 and displays said scores on a screen 132 as a function of that ranking during a step S05.

In this document, the function of displaying on a screen is not limited to displaying by a single display unit, but rather it includes displaying on a plurality of physically distinct display units, such as, for example, separate computer monitors.

In addition, displaying the digital images is not limited to displaying the images in full, but rather it includes, for example, displaying some of the images and/or images that have undergone one or more digital processing operations such as an enlargement or a change in the contrast.

In the above-described method of computing the scores, in which method the higher the score of a digital image the higher the probability that that image shows elements useful to the operative, the computer unit may make a selection of images by keeping only those images that have the highest scores and by displaying on the screen only the digital images of the selection, or by giving priority to displaying them.

The computer unit may display all of the digital images of the selection simultaneously on the screen, e.g. four images as shown by Sel-1 in FIG. 1C.

Alternatively, the computer unit may display on the screen the digital images of the selection in sequential manner in decreasing order of the scores of the digital images, as shown by Sel-2 in FIG. 1C, in such a manner as to present the images that are the most likely to be useful to the operative first, it being possible for the operative to scroll through the images on the screen manually.

In addition to or instead of a given image IN, the computer unit may also display on the screen an enlargement of a region of interest ZI defined as a region of the image in which at least one of the characteristic elements indicative of the probability of the image showing the label is present.

Figure 2D:
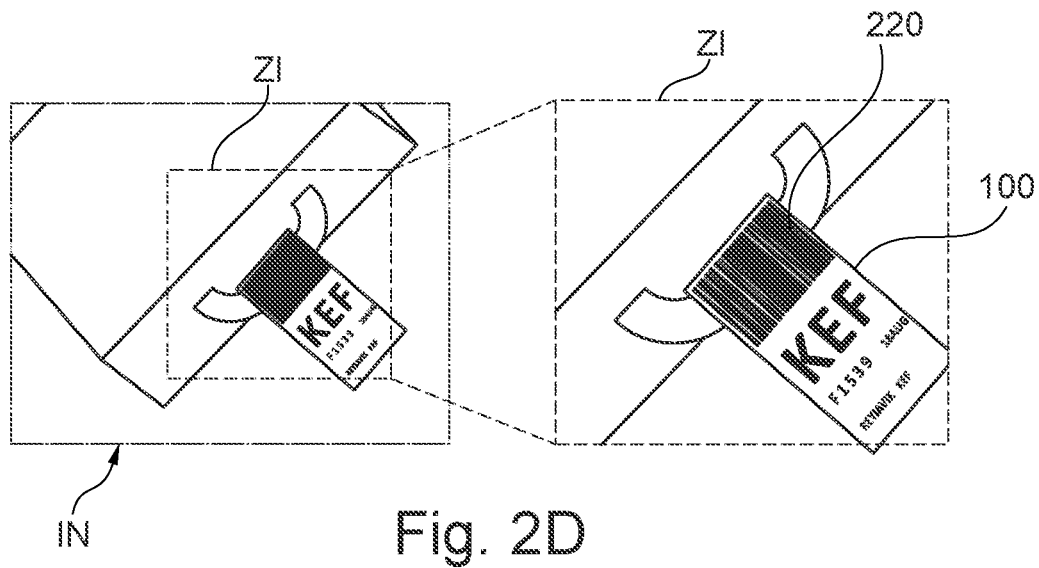

To this end, the computer unit may, for example, define a region of interest as a region of the image having a certain size and centered on at least one of the characteristic elements of the label 100, as shown in FIG. 2D in which a region of interest ZI is centered on the bar code 220 that is visible in the digital image IN.

On viewing the displayed images, selected because they have high probabilities of containing information that is useful to the human operative Op of FIG. 1B, said human operative identifies the textual information borne by the label and enters data representative of said information manually into a computer system via an input terminal 134 that may, for example be a keyboard, a touch tablet, or a voice system, during a step S06 that ends the video coding.

To assist the operative, the computer unit 135 may also display on the screen 132 information provided by a database and likely to correspond to the piece of baggage, the images of which are displayed on the screen, and preferably information also corresponding to the first characters entered manually by the operative.

A first database likely to contain information useful to sorting the piece of baggage is the baggage database 300.

Alternatively, a flights database 310 may provide such information.

Such a database 310 is local to the airport where the baggage is to be found, and lists the flights to and from that airport during a given period of activity, e.g. one day or two or more consecutive days of activity at the airport, and that includes in particular, the day on which a piece of baggage is sorted in accordance with the invention, said flights database associating, for example, for each of the flights, an IATA airport code with a flight number composed of an airline code and of a flight number internal to the airline.

Since said flights database 310 is local, it offers better stability and availability, and can be known much further in advance than a baggage database 300, and using it therefore makes it possible to achieve much greater operational reliability than using the baggage database.

In the method shown in FIG. 3C, the priority baggage identification method is automatically reading S10 the bar codes on the labels 100 attached to the baggage 110 for the purpose of unambiguously associating the bar code of each piece of baggage with data from the baggage database 300, from which representative items of data are transmitted to the automatic sorting unit 140 during a step S12 so that the automatic sorting unit 140 controls the conveyor system 101 in such a manner as to direct the piece of baggage 110 appropriately during a step S14.

In the event of failure N10 to identify a piece of baggage by means of the bar code of the corresponding label, e.g. in the event it is impossible to connect to the baggage database 300 or in the event the label is damaged, the digital images IN can be used in the context of an automated OCR analysis S20.

In this OCR analysis S20, the computer unit 135 may compare the chains of characters recognized on the label 100 with the information from the flights database 310 and, in the event of a match, transmit the data representative of the information on the label to the automatic sorting unit 140 during a step S22, in such a manner that said automatic sorting unit controls the conveyor system 101 in such a manner as to direct the piece of baggage appropriately during a step S24.

In the event of no match being found N20 or of a confidence index that is too low in the OCR analysis S20, the video coding VCS defined by the above-described steps S01 to S06 is implemented, during which video coding the computer unit 135 displays on the screen 132 information from the flights database 310 or from the baggage database 300 for assisting the human operative Op.

In response to the human operative inputting data necessary for sorting the piece of baggage, steps S22 and S24 are executed as in the OCR analysis S20, without all of the selected images having necessarily been displayed.

Thus, the method for sorting baggage at an airport with optimized video coding makes it possible to solve the problems related to reading information present on the label and the problems related to using a baggage database.

Naturally, the present invention is in no way limited to the above-described implementation, which can undergo modifications without going beyond the ambit of the invention.

The invention claimed is:

1. A method of sorting baggage at an airport, comprising:
   acquiring a plurality of digital images of a piece of baggage that are taken from different viewpoints, the piece of baggage carrying an unambiguous identification label bearing textual information about a flight, and
   video coding, wherein, in the video coding, a computer unit automatically detects a presence of characteristic elements of the unambiguous identification label in the plurality of digital images of the piece of baggage, computes a score for each of the plurality of digital images based on a count of the characteristic elements detected in each of the plurality of digital images, ranks the plurality of digital images as a function of their respective scores, and displays the ranked plurality of digital images on a screen as a function of the ranking.

2. The sorting method according to claim 1, wherein the computer unit makes a selection of the images based on their respective scores and displays the images of the selection first on the screen to an operative.

3. The sorting method according to claim 2, wherein the computer unit displays the images of the selection simultaneously on the screen.

4. The sorting method according to claim 2, wherein the computer unit displays the images of the selection sequentially on the screen based on their respective scores.

5. The sorting method according to claim 4, wherein the computer unit displays on the screen an enlargement of a region of interest including one of the characteristic elements detected in one of the plurality of digital images.

6. The sorting method according to claim 5, wherein the characteristic elements detected in the one of the plurality of digital images are chosen from among a bar code, an IATA airport code, a flight number, and a date of a flight.

7. The sorting method according to claim 6, wherein information that is retrieved from a database is used to compute the scores for each of the plurality of digital images.

8. The sorting method according to claim 7, wherein the computer unit also displays on the screen information retrieved from a flights database, from among the information retrieved from the flights database the operative chooses the information retrieved from the flights database that the operative enters into the computer unit.

9. The sorting method according to claim 8, wherein the computer unit also displays on the screen information retrieved from a baggage database, from among the information retrieved from the baggage database the operative chooses the information retrieved from the baggage database that the operative enters into the computer unit.

10. The sorting method according to claim 1, wherein the computer unit displays on the screen an enlargement of a region of interest including one of the characteristic elements detected in one of the plurality of digital images.

11. The sorting method according to claim 1, wherein the characteristic elements detected in the one of the plurality of digital images are chosen from among a bar code, an IATA airport code, a flight number, and a date of a flight.

12. The sorting method according to claim 1, wherein information that is retrieved from a database is used to compute the scores for each of the plurality of digital images.

13. The sorting method according to claim 1, wherein the computer unit also displays on the screen information retrieved from a flights database, from among the information retrieved from the flights database the operative chooses the information retrieved from the flights database that the operative enters into the computer unit.

14. The sorting method according to claim 1, wherein the computer unit also displays on the screen information retrieved from a baggage database, from among the information retrieved from the baggage database the operative chooses the information retrieved from the baggage database that the operative enters into the computer unit.

15. The sorting method according to claim 2, wherein the computer unit displays on the screen an enlargement of a region of interest including one of the characteristic elements detected in one of the plurality of digital images.

16. The sorting method according to claim 2, wherein the characteristic elements detected in the one of the plurality of digital images are chosen from among a bar code, an IATA airport code, a flight number, and a date of a flight.

* * * * *